US007934101B2

United States Patent
Stieglitz et al.

(10) Patent No.: US 7,934,101 B2
(45) Date of Patent: Apr. 26, 2011

(54) DYNAMICALLY MITIGATING A NONCOMPLIANT PASSWORD

(75) Inventors: Jeremy Stieglitz, Menlo Park, CA (US); Darran Potter, Leybourne (GB)

(73) Assignee: Cisco Technology, Inc., San Jose, CA (US)

( * ) Notice: Subject to any disclaimer, the term of this patent is extended or adjusted under 35 U.S.C. 154(b) by 1362 days.

(21) Appl. No.: 10/825,827

(22) Filed: Apr. 16, 2004

(65) Prior Publication Data

US 2005/0235341 A1    Oct. 20, 2005

(51) Int. Cl.
*G06F 7/04* (2006.01)
*G06F 12/14* (2006.01)
*G06F 21/00* (2006.01)

(52) U.S. Cl. ............. 713/183; 726/5; 726/17; 726/19; 726/27; 726/30

(58) Field of Classification Search ............... None
See application file for complete search history.

(56) References Cited

U.S. PATENT DOCUMENTS

| | | | |
|---|---|---|---|
| 4,218,738 A | 8/1980 | Matyas et al. | |
| 5,369,707 A | 11/1994 | Follendore, III | |
| 5,682,475 A | 10/1997 | Johnson et al. | |
| 5,815,657 A | 9/1998 | Williams et al. | |
| 5,964,877 A | 10/1999 | Victor et al. | |
| 6,070,244 A | 5/2000 | Orchier et al. | |
| 6,202,157 B1 | 3/2001 | Brownlie et al. | |
| 6,205,480 B1 * | 3/2001 | Broadhurst et al. | 709/225 |
| 6,317,829 B1 | 11/2001 | Van Oorschot | |
| 6,370,250 B1 | 4/2002 | Stein | |
| 6,643,784 B1 | 11/2003 | McCulligh | |
| 6,728,884 B1 | 4/2004 | Lim | |
| 6,735,310 B1 | 5/2004 | Hsing et al. | |
| 6,760,768 B2 | 7/2004 | Holden et al. | |
| 6,769,031 B1 | 7/2004 | Bero | |
| 6,772,332 B1 | 8/2004 | Boebert et al. | |
| 6,772,336 B1 | 8/2004 | Dixon, Jr. | |
| 6,826,692 B1 * | 11/2004 | White | 726/8 |
| 6,944,761 B2 * | 9/2005 | Wood et al. | 713/155 |
| 7,134,015 B2 | 11/2006 | Kulack et al. | |
| 7,191,466 B1 | 3/2007 | Hamid et al. | |
| 7,299,359 B2 * | 11/2007 | Hurley | 713/182 |
| 7,367,053 B2 * | 4/2008 | Sanai et al. | 726/6 |
| 2002/0091947 A1 | 7/2002 | Nakamura | |

(Continued)

FOREIGN PATENT DOCUMENTS

WO    WO 00/11534 A1    3/2000

OTHER PUBLICATIONS

Cisco Systems, Inc., "Easy Secure Device Deployment AAA Integration," Cisco IOS Release 12.3(8)T, pp. 1-22.

(Continued)

*Primary Examiner* — Kaveh Abrishamkar
(74) *Attorney, Agent, or Firm* — Hickman Palermo Truong & Becker LLP

(57) ABSTRACT

Techniques are disclosed for dynamically mitigating a noncompliant password. The techniques include obtaining a password from a user when the user attempts to access a service; determining whether the password meets quality criteria; and if the password does not meet the quality criteria, performing one or more responsive actions that relate to accessing the service.

72 Claims, 4 Drawing Sheets

U.S. PATENT DOCUMENTS

2003/0041251 A1* 2/2003 Kumhyr .................. 713/184
2004/0250139 A1* 12/2004 Hurley .................. 713/202
2004/0250141 A1* 12/2004 Casco-Arias et al. ........ 713/202

OTHER PUBLICATIONS

International Searching Authority, "Notification of the Transmittal of the International Search Report and the Written Opinion of the International Searching Authority, or the Declaration," PCT/US05/12516, dated Aug. 24, 2005, 10 pages.

Current Claims, PCT/US05/12516, 17 pages.

UK Intellectual Property Office, "Patents Act 1977: Examination Report under Section 18(3)", foreign application No. GB0619600.0, Dated Jun. 20, 2008, 2 pages.

Clean Claims, foreign application No. GB0619600.0, 4 pages.

* cited by examiner

DYNAMICALLY MITIGATING A NONCOMPLIANT PASSWORD

FIELD OF THE INVENTION

The present invention generally relates to computer security with password rules enforcement. The invention relates more specifically to dynamically mitigating a noncompliant password.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

One type of computer system provides the ability to authenticate, authorize, and account (AAA) for users accessing computer services in the system on a network. The AAA services provide security to ensure that legitimate users are accepted, their access is controlled with authorization parameters, and their behaviors are tracked and audited with accounting. The AAA services also attempt to ensure that unknown or illegitimate users can be blocked. AAA services may be used in network systems, where the AAA service may be a separate process or physical device such as an access control server, or may be used in computer systems, where the AAA service is a thread or programming module running as part of a computer system on one or more physical machines. To protect users from entering "weak" or guessable passwords, some AAA systems retain password rules. These rules require certain password lengths, special characters, or other requirements for user passwords, thereby ensuring that only "strong" passwords are used.

A problem with the approach is that these systems help protect against weak passwords, but do so only at the time of password creation. Therefore, if password rules change, there is no way to ensure compliance of the passwords that are already in the repository. There is no batch mechanism to apply password rules to hundreds or thousands of passwords or to change out-of-compliance passwords that already exist in the system.

AAA servers may proxy authentication to other services or servers. For example, the AAA server may proxy an Oracle™ database server and an application-licensing server each running on separate physical machines. Each of the services may have its own password policy or security policy, may have different password policies based on the role of the user (e.g. administrator, guest, etc.), and may change its password policies over time. A second problem with the approach is that the AAA system has no mechanism for enforcing different security or password policies based on which service is being accessed, role of the user, or newly defined password rules.

Therefore, there is clearly a need for techniques to ensure that mitigating action is taken when passwords in the repository are not compliant with applicable security or password policy.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
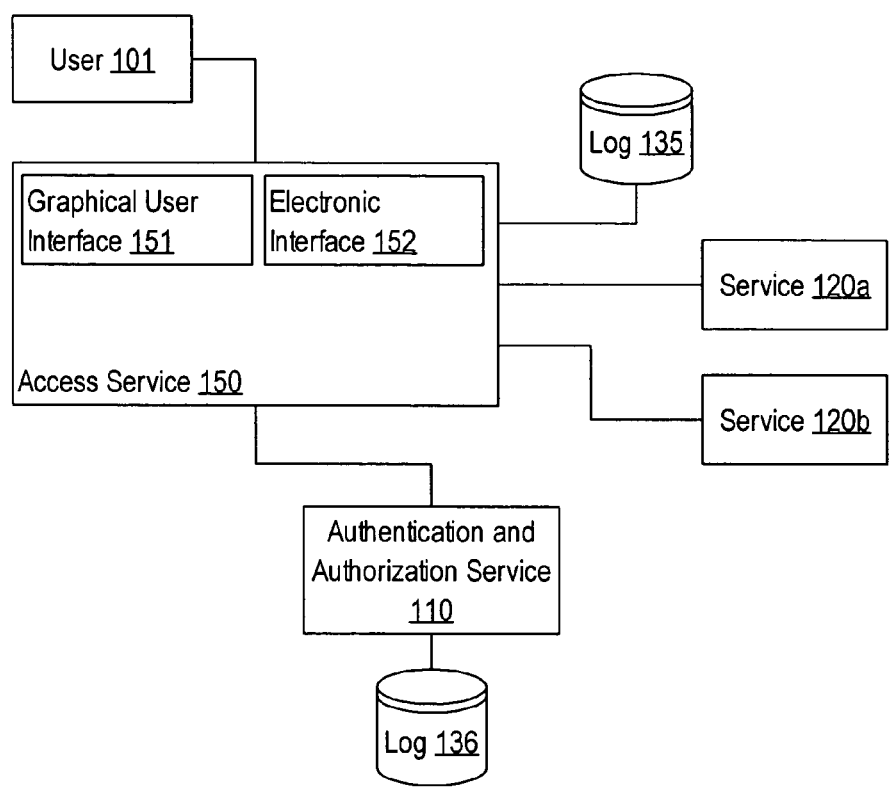
FIG. 1 is a block diagram that illustrates an overview of a system for dynamically mitigating a noncompliant password.

A method and apparatus for dynamically mitigating a noncompliant password is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural Overview
3.0 Functional Overview
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method dynamically mitigating a noncompliant password by obtaining a password from a user when the user attempts to access a service; determining whether the password meets quality criteria; and if the password does not meet the quality criteria, performing one or more responsive actions that relate to accessing the service.

In a related feature, the step of performing one or more responsive actions that relate to accessing the service includes, if the password meets the quality criteria, granting to the user a first level of access to the service, where the first level of access to the service is associated with the quality criteria; if the password meets a second quality criteria, granting to the user a second level of access to the service, where the second level of access to the service is associated with the second quality criteria, where the second quality criteria is distinct from the quality criteria and where, if a particular password meets the quality criteria, then the password meets the second quality criteria.

In a related feature, the step of performing one or more responsive actions that relate to accessing the service may include performing one or more of logging information related to the password; sending a report about the password; generating an alert about the password; forcing a password change; or blocking the user's access to the service. In a related feature, the method further includes, if the password does meet the quality criteria, providing user access to the service.

In a related feature, the step of determining whether the password meets quality criteria includes one or more of the steps of performing a dictionary look-up based on the one or more symbols used in the password; checking the length of the one or more symbols used in the password; checking the number of unique characters of the one or more symbols used in the password; checking the case of the characters in the one or more symbols used in the password; checking the sequencing of characters in the one or more symbols used in the password; or performing statistical analysis based on the one or more symbols used in the password.

In a related feature, the step of performing one or more responsive actions that relate to accessing the service includes logging information related to the password. In a related feature, the step of performing one or more responsive actions that relate to accessing the service includes sending a report about the password. In a related feature, the step of performing one or more responsive actions that relate to accessing the service includes generating an alert about the password. In a related feature, the step of performing one or more responsive actions that relate to accessing the service includes forcing a password change. In a related feature, the step of performing one or more responsive actions that relate to accessing the service includes blocking the user's access to the service.

In a related feature, obtaining the password from the user includes obtaining the password from the user via a graphical user interface. In a related feature, obtaining the password from the user includes obtaining the password from the user via an electronic interface. In a related feature, the method further includes the step of determining a quality score for the password, and where the step of determining whether the password meets quality criteria includes comparing the quality score to a predefined threshold value.

In a related feature, the method further includes obtaining the password from a repository of passwords; making a first determination whether the password meets quality criteria; and storing in a particular machine-readable medium an indication of the first determination for the password; where the step of determining whether the password meets quality criteria includes accessing the particular machine-readable medium.

In a related feature, the step of obtaining the password includes obtaining the password from a particular user, the particular user is associated with a particular user role, and where determining whether the password meets quality criteria includes determining whether the password meets quality criteria for the particular user role. In a related feature, determining whether the password meets the quality criteria includes determining whether the password meets quality criteria for the service.

In a related feature, the step of obtaining the password includes an access service obtaining the password from the user when the user attempts to access the service, where the access service includes machine executable instructions executing on a particular machine, and the service includes machine executable instruction executing on the same particular machine. In a related feature, the step of obtaining the password includes an access service obtaining the password from the user when the user attempts to access the service, where the access service includes machine executable instructions executing on a first machine and the service includes machine executable instructions executing on a second machine, where the first machine is distinct from the second machine.

In other aspects, the invention encompasses a computer apparatus and a machine-readable medium configured to carry out the foregoing steps.

2.0 Structural Overview

FIG. 1 is a block diagram that illustrates an overview of a system for dynamically mitigating a noncompliant password.

A user 101 is communicatively coupled to an access service 150. The user 101 may be a human, a human operating a logical machine, or a physical machine. The access service 150 is communicatively coupled to a log 135, services 120a and 120b, and an authentication and authorization service 110. The authentication and authorization service 110 is also communicatively coupled to a log 136. In various embodiments, the coupling is accomplished by optical, infrared, or radio signal transmission, direct cabling, wireless networking, local area networks (LANs), wide area network (WANs), the Internet, or any appropriate communication mechanism.

The access service 150 may be communicatively coupled to a log 135, and the authentication and authorization service 110 may be communicatively coupled to a log 136. In various embodiments, the logs 135, 136 are databases, flat files, data structures, or any other appropriate storage means. The access service 150 may store information related to activity at the access service 150 in the log 135. Similarly, the authentication and authorization service 110 may store information related to activity at the authentication and authorization service 110 in the log 136.

The access service 150, services 120a and 120b, and authentication and authorization service 110 may each be implemented on a logical machine. Each logical machine may run on separate physical computing machines or may run on the same physical computing machine as one or more of the other logical machines. Each logical machine may run as a separate process on the same physical machine. Logical machines may comprise one or more computer programs or other software elements. One or more of the logical machines may run as part of the same process or thread on the same physical machine. Various embodiments of computers and other physical machines are described in detail below in the section entitled Hardware Overview.

In various embodiments, the access service 150 comprises or is hosted by a wireless access point, a virtual private network device, a network access server, a switch, a router, or any other appropriate device. In other embodiments, the access service 150 is a computer program module, embedded machine instructions, or any other appropriate service. In one embodiment, the access service 150 is a Cisco Secure Access Control Server.

For example, a computer program running on a computer may provide programming modules for access service 150, services 120a and 120b, and authentication and authorization service 110 as part of a single computer program to control access to services 120a and 120b. The computer program may control the access of a user 101 by proving an access service 150 to retrieve a username and password when the user 101 tries to access the either of services 120a and 120b, and an authentication and authorization service 110 to determine the validity of the username and password.

As another example, the access service 150 may be a wireless access point that controls access to services 120a and 120b on the wireless network, and the authentication and authorization service 110 is an Authentication, Authorization, and Accounting server. A user 101 is a supplicant attempting to access the service 120a. The wireless access point 150 obtains a username and password from the supplicant 101 and the AAA server 110 authenticates and authorizes the supplicant 101. If the supplicant 101 is successfully authenticated and authorized, the wireless access point 150 provides the supplicant 101 access to the service 120a. In one embodiment, the access service 150 provides a graphical user interface (GUI) 151 to the user 101 and the user 101 is communicatively coupled to the access service 150 via the GUI 151.

In other embodiments, the authentication and authorization service 110 or a process thereto communicatively coupled provides the GUI 151 to the user. In various embodiments, a graphical user interface 151 is provided to a user 101 via a computer program running on a machine accessible to the user, via a hypertext transfer protocol (HTTP), secure HTTP (HTTPS), or file transfer protocol (FTP) server, via an rsync gateway, via a HTML or XML browser, or any appropriate means.

Alternatively, the user 101 may be provided an electronic interface 152. In various embodiments, the electronic interface 152 comprises a HTTP server or client, a HTTPS server or client, a FTP server or client, an rsync gateway, Transmission Control Protocol (TCP)/Internet Protocol (IP) sockets, Universal Datagram Protocol (UDP) sockets, or any other appropriate communication means. Alternatively, the electronic interface 152 may include a remote procedure call interface, a Java Remote Method Invocation interface, or any other remote interface. In related embodiments, the electronic interface 152 allows communications to be formatted in a proprietary format, Extensible Markup Language (XML), Hypertext Markup Language (HTML), or any other appropriate format. In one embodiment, the access service 150 provides an electronic interface 152, and the user 101 is communicatively coupled to the access service 150 via the electronic interface 152. In other embodiments, the authentication and authorization service 110 or a process thereto communicatively coupled provides the electronic interface 152.

3.0 Functional Overview

Figure 2A:
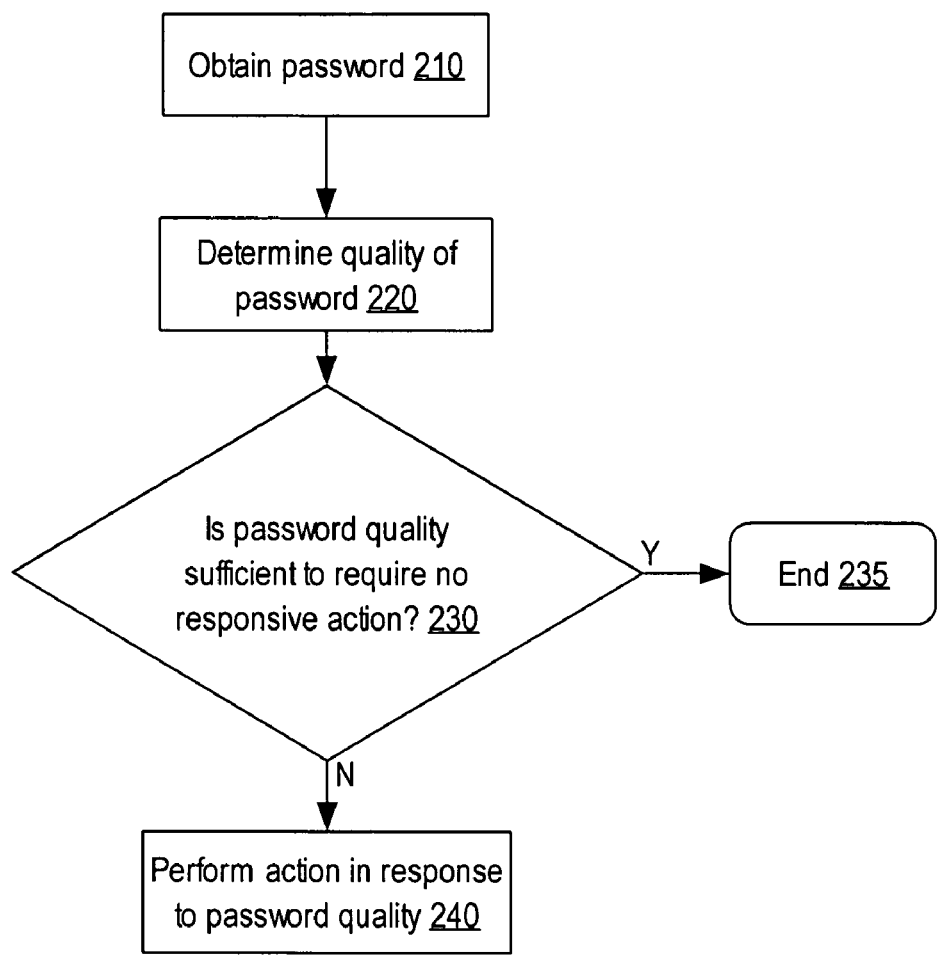
FIG. 2A is a flow diagram that illustrates a high level overview of one embodiment of a method for dynamically mitigating a noncompliant password.

FIG. 2A is a flow diagram that illustrates a high level overview of one embodiment of a method for dynamically mitigating a noncompliant password.

In step 210, a password is obtained. A password may be obtained from a user by an access service when the user attempts to access a particular service, the access to which is controlled by the access service. In various embodiments, obtaining a password includes receiving a password from the user via a graphical or electronic interface. For example, in the context of FIG. 1, an access service 150 obtains a password from a user 101 when the user attempts to access a service 120a, the access service 150 provides to the user 101 a GUI 151 into which a human user may type a username and password. As another example, in the context of FIG. 1, a user 101 is a machine attempting to access a service 120a. The access service 150 provides an electronic interface 152 to the user 101. The user 101 provides the password to the access service 150 via the electronic interface 152.

In step 220, the quality of the password is determined. In various embodiments, determining the quality of a password includes performing a dictionary lookup on the password, checking the length of the password, checking the number of unique characters in the password, checking the mixing of cases in the password, checking the sequencing of the characters in the password, performing a statistical analysis of the password, or any other appropriate check. See for example the "Department of Defense Password Management Guideline", CSC-STD, 85-002, Department of Defense Computer Security Center, 1986.

In one embodiment, one or more quality scores are generated for the password. In a related embodiment, the one or more quality scores are generated after the password is obtained in step 210. Alternatively, the one or more quality scores may be generated before the password is obtained in step 210. For example, in the context of FIG. 1, an authentication and authorization service 110 determines the quality scores of one or more passwords, including a particular password, each time there is a change to the password policy for the authentication and authorization service 110. When the access service 150 sends the particular password to the authentication and authorization service 110, the authentication and authorization service 110 performs a check of the quality of the password by retrieving from a machine-readable medium the latest quality score determined for the particular password.

In step 230, a test is performed to determine whether the password is of sufficient quality. Testing to determine whether the password is of sufficient quality may include comparing a quality score generated in step 220 to a predetermined value or a set of predetermined values. For example, a quality score generated in step 220 may be compared to a force-password-change threshold value and an alert threshold value, where the force-password-change value is lower than the alert value. If the quality score generated in step 220 is below the force-password-change threshold value, then the user is forced to change the password in step 240 (described below). If the quality score generated in step 220 is above the force-password-change threshold value, but below the alert value, then the user is notified that the password should be changed (in step 240), or a log record is created, but a change is not forced.

In various embodiments, determining whether the password is of sufficient quality includes determining the role of the user or the access that the user is permitted for the service. A user may be associated with a role such as administrator, user, or guest. Each role may have associated with it a different password strength requirement. For example, a password for a user with the role of "administrator" may need to be stronger than a password for the role of user. A password for a user with the role of "guest" may not need to be as strong as passwords for users in the role of admin or user.

In one embodiment, an access service controls access to multiple services. In such an embodiment, the password strength for each service may be different. Consequentially, a password may be of high-enough quality for one service, but not for another service. For example, in the context of FIG. 1, an access service 150 controls access to two services 120a and 120b. When a user 101 attempts to access the first service 120a (e.g. a web server providing an intranet containing company news), the access service 150 determines that the password provided by the user 101 is of high-enough quality. If the same user 101 then attempts to access a second service 120b (e.g. a database of employee information), then the access service 150 performs a check and determines that the password is not of high-enough quality and takes further action in step 240. These processes may be performed if the password is obtained at the time each service is accessed, or if the password is obtained once before both accesses.

If the password is determined to have sufficient quality in step 230, then in step 235, the method for dynamically mitigating a noncompliant password is ended. In various embodiments, ending the process of dynamically mitigating a noncompliant password includes granting the user access to a service or passing control to another process or machine to further validate the user. For example, in the context of FIG. 1, if the password given by a user 101 is determined sufficient in step 230, then in step 235, the user 101 is granted access to the service 120a.

If the password is determined insufficient in step 230, then in step 240 an appropriate action is performed to respond to the password quality. Performing an appropriate action in response to password quality is described in more detail below with respect to FIG. 2B.

Figure 2B:
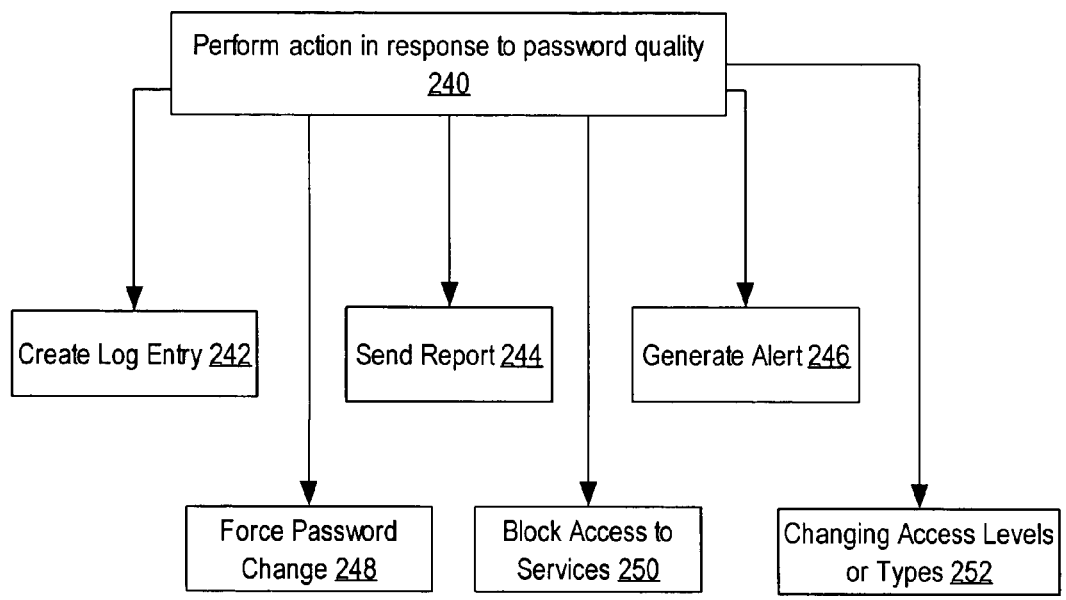
FIG. 2B is a flow diagram that illustrates examples of performing a responsive action to a password not being of sufficient quality.

FIG. 2B is a flow diagram that illustrates examples of performing a responsive action to a password not being of sufficient quality.

In various embodiments, performing the appropriate action 240 includes logging information related to the password 242, sending a report about the password 244, generating an alert about the password 246, forcing a password change 248, blocking the user's access to the service 250, changing access levels or types 252, or any other appropriate action. In related embodiments, the action taken is based on a quality score determined during step 220.

In one embodiment, logging information related to the password 242 may include writing information to a log file, database, or any machine-readable medium about the password, its strength, the checks performed on the password, the user, the user's role, or the service to which the user was attempting to gain access. For example, in the context of FIG. 1, a user 101 attempts to access a service 120a via an access service 150. The access service 150 determines that the password is not of very high quality, but is of high-enough quality to not force the user to change the password. The access service 150 then writes an entry to its log 135 as part of step 242. The entry in the log 135 may later be used by an automated process or a human operator to perform an "audit" of the strength of passwords that have been seen by the access service 150.

In various embodiments, the action taken in step 240 is to send a report to the user, to a system administrator, or to any appropriate party (step 244). The report may include information related to the user, the password, the checks performed on the password, the service, or any other appropriate information. For example, in the context of FIG. 1, a password is provided by a user 101 to access service 150, and the access service 150 provides the password to an authentication and authorization service 110. The authentication and authorization service 110 determines that the password is not of high-enough quality. In response to the password not being of high-enough quality, the authentication and authorization service 110, as part of step 244, sends a report to a network administrator indicating that the password for the particular user 101 is not of high-enough quality. The report may be an email, one or more entries in a database, an instant message, etc.

In one embodiment, in step 240 an alert about the password is generated (step 246). In various embodiments, the alert is provided to the user, to an administrator or to a machine. For example, in the context of FIG. 1, after an authentication and authorization service 110 performs a check on a user's 101 password, the authentication and authorization service 110 may provide, as part of step 246, an alert indicating that the password is not of high enough quality and should be changed by the user. As another example, upon detection of a password that is not of high-enough quality, an alert may be sent to an administrator or machine that may later require the user 101 to provide a new password.

Step 240 may include forcing a password change (step 248) upon detection that the password does not meet the predefined criteria. In a related embodiment, the user is then prompted to enter a new password. In one embodiment, a check is performed to determine whether the new password meets the predefined criteria and, if the new password does not, then the new password is not accepted. In one embodiment, once a user has entered a password that meets the predefined criteria, the password is stored, and the user is granted access to the service. For example, in the context of FIG. 1, if an authentication and authorization service 110 determines that the password for a user 101 is not of high-enough quality, then the authentication and authorization service 110 informs the access service 150 about the quality determination. The access service 150 then requires the user 101 to enter a new password as part of step 248. If the new password does not meet the predefined criteria for quality, then the access service 150 may require the user 101 to continue entering different passwords until one of the passwords meets the quality criteria. Once the user 101 has entered a password that meets the quality criteria, the user 101 is granted access to the service 120a.

In one embodiment, step 240 includes blocking the user's access to the service (step 250). In a related embodiment, in addition to the user's access being blocked, the user is informed that there is a requirement to change the password used to access the particular service to make it of high-enough quality in order to regain access to the service. For example, in the context of FIG. 1, an access service 150 blocks a user's 101 access to a service 120a (step 250) and indicates that the user 101 must perform a password change and provides instructions on how to change the password. In one alternative, the user may be instructed about how to improve password quality.

In one embodiment, step 240 includes changing access levels or types (step 252). In a related embodiment, if a user's password does not have a level of quality above a first predefined quality level, but does have a level of quality above a second predefined quality level, where the first predefined quality level is higher than the second predefined quality level, then the user is provided the lower level of access associated with the second predefined quality level. In a related embodiment, if the user's password has a level of quality above the first predefined quality level, then the user is provided a higher level of access associated with the first predefined quality level. For example, in the context of FIG. 1, an access service 150 determines that a user's 101 password is better than a "guest password" level of quality, but is not better than an "administrator" level of quality. Consequently, the access service 150 provides the user 101 with guest privileges to the services it controls—where the guest level privileges are a subset of the privileges provided at administrator level ("administrator privileges"). If a second user 101 logs in with a password that meets the higher, administrator level of quality, then the second user 101 is provided with administrator privileges.

Various embodiments described with respect to FIG. 2A and FIG. 2B enable dynamic enforcement of password schemes. Other embodiments described with respect to FIG. 2A and FIG. 2B enable dynamic mitigation of passwords that do not meet predefined criteria. The embodiments described herein enable one to make and use a system where a password scheme may be dynamically enforced (or used to mitigate password quality) based on user role or based on the service to which a user wishes to gain access.

4.0 Implementation Mechanisms—Hardware Overview

Figure 3:
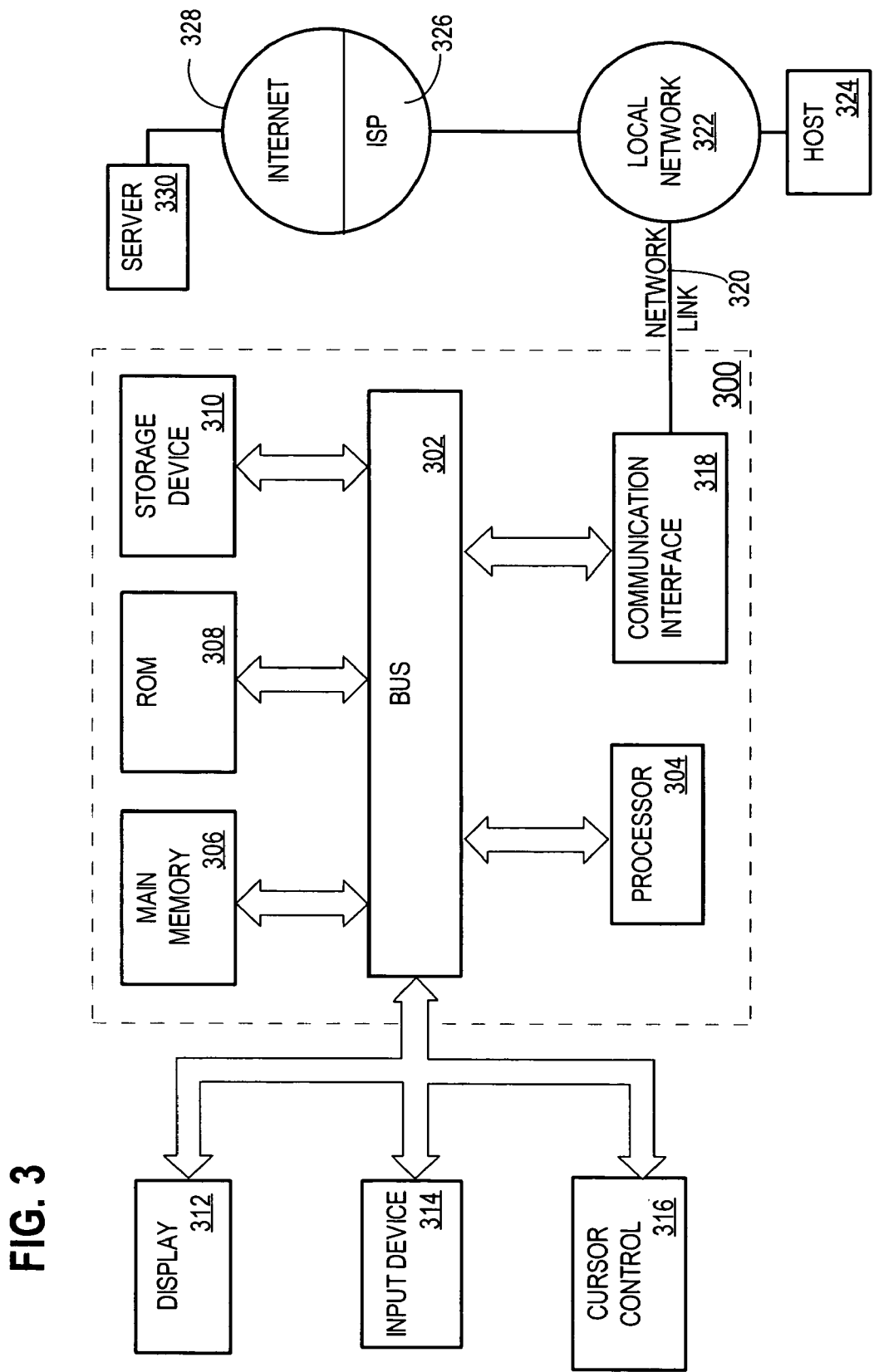
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for dynamically mitigating a noncompliant password. According to one embodiment of the invention, dynamically mitigating a noncompliant password is provided by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions.

The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for dynamically mitigating a noncompliant password as described herein.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of dynamically mitigating a noncompliant password, the method comprising:
   obtaining a password from a user when the user attempts to access a service;
   determining whether the password meets quality criteria;
   if the password does not meet the quality criteria, granting to the user a different level of access to the service than if the password meets the quality criteria;
   wherein the user is associated with a particular user role, of a plurality of user roles;

wherein determining whether the password meets quality criteria comprises determining whether the password meets quality criteria for the particular user role, and wherein a different quality criteria is associated with a second user role of the plurality of user roles;

wherein the quality criteria is based, at least in part, on a strength of the password;

wherein the method is performed by one or more computing devices.

2. The method of claim 1, further comprising:

if the password meets the quality criteria, granting to the user a first level of access to the service, wherein the granting of the first level of access to the service is dependent on the password exceeding a quality criteria threshold.

3. The method of claim 1, further comprising:

if the password meets a second quality criteria, granting to the user a second level of access to the service, wherein the second level of access to the service is associated with the second quality criteria, wherein the second quality criteria is distinct from the quality criteria and wherein, if a particular password meets the quality criteria, then the password meets the second quality criteria.

4. The method of claim 1, further comprising if the password does not meet the quality criteria, performing one or more of:

logging information related to the password;
sending a report about the password;
generating an alert about the password;
forcing a password change; or
blocking the user's access to the service.

5. The method of claim 1, further comprising providing user access to the service if the password does meet the quality criteria.

6. The method of claim 1, wherein determining whether the password meets quality criteria further comprises one or more of the steps of:

performing a dictionary look-up based on one or more symbols used in the password;
checking a length of the one or more symbols used in the password;
checking a number of unique characters of the one or more symbols used in the password;
checking a case of the characters in the one or more symbols used in the password;
checking a sequencing of characters in the one or more symbols used in the password; or
performing statistical analysis based on the one or more symbols used in the password.

7. The method of claim 1, wherein performing one or more responsive actions that relate to accessing the service comprises logging information related to the password.

8. The method of claim 1, further comprising sending a report about the password if the password does not meet the quality criteria.

9. The method of claim 1, further comprising generating an alert about the password if the password does not meet the quality criteria.

10. The method of claim 1, further comprising forcing a password change if the password does not meet the quality criteria.

11. The method of claim 1, further comprising blocking the user's access to the service if the password does not meet the quality criteria.

12. The method of claim 1, wherein obtaining the password from the user comprises obtaining the password from the user via a graphical user interface.

13. The method of claim 1, wherein obtaining the password from the user comprises obtaining the password from the user via an electronic interface.

14. The method of claim 1, wherein the method further comprises:

determining a quality score for the password, and wherein the step of determining whether the password meets quality criteria comprises comparing the quality score to a predefined threshold value.

15. The method of claim 1, further comprising:

obtaining the password from a repository of passwords;
making a first determination whether the password meets quality criteria;
storing in a particular machine-readable medium an indication of the first determination for the password;
wherein the step of determining whether the password meets quality criteria comprises accessing the particular machine-readable medium.

16. The method of claim 1, wherein determining whether the password meets quality criteria comprises determining whether the password meets quality criteria for the service.

17. The method of claim 1, wherein obtaining the password comprises an access service obtaining the password from the user when the user attempts to access the service, and wherein the access service comprises machine executable instructions executing on a particular machine, and the service comprises machine executable instructions executing on the same particular machine.

18. The method of claim 1, wherein obtaining the password comprises an access service obtaining the password from the user when the user attempts to access the service, and wherein the access service comprises machine executable instructions executing on a first machine and the service comprises machine executable instructions executing on a second machine, wherein the first machine is distinct from the second machine.

19. A method of dynamically mitigating a noncompliant password, the method comprising:

obtaining a password from a user when the user attempts to access a service;
determining whether the password meets quality criteria;
if the password does not meet the quality criteria, granting to the user a different level of access to the service than if the password meets the quality criteria;
wherein the user is associated with a particular user role, of a plurality of user roles;
wherein determining whether the password meets quality criteria comprises determining whether the password meets quality criteria for the particular user role and wherein a different quality criteria is associated with a second user role of the plurality of user roles;
wherein the quality criteria is based, at least in part, on a strength of the password;
wherein determining whether the password meets quality criteria further comprises one or more of the steps of:
performing a dictionary look-up based on one or more symbols used in the password;
checking a length of the one or more symbols used in the password;
checking a number of unique characters of the one or more symbols used in the password;
checking a case of the characters in the one or more symbols used in the password;

checking a sequencing of characters in the one or more symbols used in the password; or performing statistical analysis based on the one or more symbols used in the password;

wherein the method is performed by one or more computing devices.

20. The method of claim 19, further comprising:

if the password meets the quality criteria, granting to the user a first level of access to the service, wherein the granting of the first level of access to the service is dependent on the password exceeding a quality criteria threshold.

21. A non-transitory machine-readable medium storing one or more sequences of instructions for dynamically mitigating a noncompliant password, which instructions, when executed by one or more processors, cause the one or more processors to perform:

obtaining a password from a user when the user attempts to access a service;

determining whether the password meets quality criteria;

if the password does not meet the quality criteria, granting to the user a different level of access to the service than if the password meets the quality criteria;

wherein the user is associated with a particular user role, of a plurality of user roles;

wherein determining whether the password meets quality criteria comprises determining whether the password meets quality criteria for the particular user role and wherein a different quality criteria is associated with a second user role in the plurality of user roles;

wherein the quality criteria is based, at least in part, on a strength of the password.

22. The non-transitory machine-readable medium of claim 21, further storing instructions which, when executed by the one or more processors, cause the one or more processors to perform:

if the password meets the quality criteria, granting to the user a first level of access to the service, wherein the granting of the first level of access to the service is dependent on the password exceeding a quality criteria threshold.

23. The non-transitory machine-readable medium of claim 21, further storing instructions which, when executed by the one or more processors, cause the one or more processors to perform:

if the password meets a second quality criteria, granting to the user a second level of access to the service, wherein the second level of access to the service is associated with the second quality criteria, wherein the second quality criteria is distinct from the quality criteria and wherein, if a particular password meets the quality criteria, then the password meets the second quality criteria.

24. The non-transitory machine-readable medium of claim 21, further storing instructions which, when executed by the one or more processors, cause the one or more processors to perform: if the password does not meet the quality criteria, performing one or more of:

logging information related to the password;
sending a report about the password;
generating an alert about the password;
forcing a password change; or
blocking the user's access to the service.

25. The non-transitory machine-readable medium of claim 21, further storing instructions which, when executed by the one or more processors, cause the one or more processors to perform: providing user access to the service if the password does meet the quality criteria.

26. The non-transitory machine-readable medium of claim 21, further storing instructions which, when executed, cause the one or more processors to perform:

performing a dictionary look-up based on one or more symbols used in the password;

checking a length of the one or more symbols used in the password;

checking a number of unique characters of the one or more symbols used in the password;

checking a case of the characters in the one or more symbols used in the password;

checking a sequencing of characters in the one or more symbols used in the password; or performing statistical analysis based on the one or more symbols used in the password.

27. The non-transitory machine-readable medium of claim 21, further storing instructions which, when executed by the one or more processors, cause the one or more processors to perform: logging information related to the password if the password does not meet the quality criteria.

28. The non-transitory machine-readable medium of claim 21, further storing instructions which, when executed by the one or more processors, cause the one or more processors to perform: sending a report about the password if the password does not meet the quality criteria.

29. The non-transitory machine-readable medium of claim 21, further storing instructions which, when executed by the one or more processors, cause the one or more processors to perform: generating an alert about the password if the password does not meet the quality criteria.

30. The non-transitory machine-readable medium of claim 21, further storing instructions which, when executed by the one or more processors, cause the one or more processors to perform: forcing a password change if the password does not meet the quality criteria.

31. The non-transitory machine-readable medium of claim 21, further storing instructions which, when executed by the one or more processors, cause the one or more processors to perform: blocking the user's access to the service if the password does not meet the quality criteria.

32. The non-transitory machine-readable medium of claim 21, further storing instructions which, when executed by the one or more processors, cause the one or more processors to perform: obtaining the password from the user via a graphical user interface.

33. The non-transitory machine-readable medium of claim 21, further storing instructions which, when executed by the one or more processors, cause the one or more processors to perform: obtaining the password from the user via an electronic interface.

34. The non-transitory machine-readable medium of claim 21, further storing instructions which, when executed by the one or more processors, cause the one or more processors to perform: determining a quality score for the password, and wherein determining whether the password meets quality criteria comprises comparing the quality score to a predefined threshold value.

35. The non-transitory machine-readable medium of claim 21, further storing instructions which, when executed by the one or more processors, cause the one or more processors to perform:

obtaining the password from a repository of passwords;
making a first determination whether the password meets quality criteria;

storing in a particular machine-readable medium an indication of the first determination for the password;
wherein determining whether the password meets quality criteria comprises accessing the particular machine-readable medium.

36. The non-transitory machine-readable medium of claim 21, further storing instructions which, when executed by the one or more processors, cause the one or more processors to perform: determining whether the password meets quality criteria for the service.

37. An apparatus for dynamically mitigating a noncompliant password, comprising:
one or more processors;
means for obtaining a password from a user when the user attempts to access a service;
means for determining whether the password meets quality criteria;
means for granting a different level of access, if the password does not meet the quality criteria, than if the password meets the quality criteria;
wherein the user is associated with a particular user role, of a plurality of user roles;
wherein determining whether the password meets quality criteria comprises determining whether the password meets quality criteria for the particular user role and wherein a different quality criteria is associated with a second user role in the plurality of user roles;
wherein the quality criteria is based, at least in part, on the strength of the password.

38. The apparatus of claim 37, further comprising:
means for granting a first level of access to the service if the password meets the quality criteria, wherein the first level of access to the service is associated with the quality criteria.

39. The apparatus of claim 37, further comprising:
means for granting to the user a second level of access to the service, if the password meets a second quality criteria, wherein the second level of access to the service is associated with the second quality criteria, wherein the second quality criteria is distinct from the quality criteria and wherein, if a particular password meets the quality criteria, then the password meets the second quality criteria.

40. The apparatus of claim 37, further comprising means for performing, if the password does not meet the quality criteria, one or more of:
means for logging information related to the password;
means for sending a report about the password;
means for generating an alert about the password;
means for forcing a password change; or
means for blocking the user's access to the service.

41. The apparatus of claim 37, wherein the apparatus further comprises means for providing user access to the service if the password does meet the quality criteria.

42. The apparatus of claim 37, wherein the means for determining whether the password meets quality criteria further comprises one or more of:
means for performing a dictionary look-up based on one or more symbols used in the password;
means for checking a length of the one or more symbols used in the password;
means for checking a number of unique characters of the one or more symbols used in the password;
means for checking a case of the characters in the one or more symbols used in the password;
means for checking a sequencing of characters in the one or more symbols used in the password; or
means for performing statistical analysis based on the one or more symbols used in the password.

43. The apparatus of claim 37, further comprising means for logging information related to the password if the password does not meet the quality criteria.

44. The apparatus of claim 37, further comprising means for sending a report about the password if the password does not meet the quality criteria.

45. The apparatus of claim 37, further comprising means for generating an alert about the password if the password does not meet the quality criteria.

46. The apparatus of claim 37, further comprising means for forcing a password change if the password does not meet the quality criteria.

47. The apparatus of claim 37, further comprising means for blocking the user's access to the service if the password does not meet the quality criteria.

48. The apparatus of claim 37, wherein the means for obtaining the password from the user comprises means for obtaining the password from the user via a graphical user interface.

49. The apparatus of claim 37, wherein the means for obtaining the password from the user comprises means for obtaining the password from the user via an electronic interface.

50. The apparatus of claim 37, wherein the apparatus further comprises means for determining a quality score for the password, and wherein the means for determining whether the password meets quality criteria comprises means for comparing the quality score to a predefined threshold value.

51. The apparatus of claim 37, further comprising:
means for obtaining the password from a repository of passwords;
means for making a first determination whether the password meets quality criteria;
means for storing in a particular machine-readable medium an indication of the first determination for the password;
wherein the means for determining whether the password meets quality criteria comprises means for accessing the particular machine-readable medium.

52. The apparatus of claim 37, wherein means for determining whether the password meets quality criteria comprises means for determining whether the password meets quality criteria for the service.

53. The apparatus of claim 37, wherein the means for obtaining the password comprises means for an access service to obtain the password from the user when the user attempts to access the service, and wherein the access service comprises means for executing on a particular machine, and wherein the service comprises means for executing on the same particular machine.

54. The apparatus of claim 37, wherein the means for obtaining the password comprises means for an access service to obtain the password from the user when the user attempts to access the service, and wherein the access service comprises means for executing on a first machine and the service comprises means for executing on a second machine, wherein the first machine is distinct from the second machine.

55. An apparatus for dynamically mitigating a noncompliant password, comprising:
a network interface that is coupled to the data network for receiving one or more packet flows therefrom;
a processor;
one or more stored sequences of instructions which, when executed by the processor, cause the processor to perform:

obtaining a password from a user when the user attempts to access a service;

determining whether the password meets quality criteria;

if the password does not meet the quality criteria, granting to the user a different level of access to the service than if the password meets the quality criteria;

wherein the user is associated with a particular user role, of a plurality of user roles;

wherein determining whether the password meets quality criteria comprises determining whether the password meets quality criteria for the particular user role and wherein a different quality criteria is associated with a second user role in the plurality of user roles;

wherein the quality criteria is based, at least in part, on a strength of the password.

56. The apparatus of claim 55, further comprising instructions which, when executed by the processor, cause the processor to perform: if the password meets the quality criteria, granting to the user a first level of access to the service, wherein the granting of the first level of access to the service is dependent on the password exceeding a quality criteria threshold.

57. The apparatus of claim 55, further comprising one or more stored sequences of instructions which, when executed by the processor, cause the processor to perform: if the password meets a second quality criteria, granting to the user a second level of access to the service, wherein the second level of access to the service is associated with the second quality criteria, wherein the second quality criteria is distinct from the quality criteria and wherein, if a particular password meets the quality criteria, then the password meets the second quality criteria.

58. The apparatus of claim 55, further comprising one or more stored sequences of instructions which, when executed by the processor, cause the processor to perform: if the password does not meet the quality criteria, performing one or more of:
   logging information related to the password;
   sending a report about the password;
   generating an alert about the password;
   forcing a password change; or
   blocking the user's access to the service.

59. The apparatus of claim 55, further comprising one or more stored sequences of instructions which, when executed by the processor, cause the processor to perform: providing user access to the service if the password does meet the quality criteria.

60. The apparatus of claim 55, further comprising one or more stored sequences of instructions which, when executed by the processor, cause the processor to perform:
   performing a dictionary look-up based on a one or more symbols used in the password;
   checking a length of the one or more symbols used in the password;
   checking a number of unique characters of the one or more symbols used in the password;
   checking a case of the characters in the one or more symbols used in the password;
   checking a sequencing of characters in the one or more symbols used in the password; or
   performing statistical analysis based on the one or more symbols used in the password.

61. The apparatus of claim 55, further comprising one or more stored sequences of instructions which, when executed by the processor, cause the processor to perform: logging information related to the password if the password does not meet the quality criteria.

62. The apparatus of claim 55, further comprising one or more stored sequences of instructions which, when executed by the processor, cause the processor to perform: sending a report about the password if the password does not meet the quality criteria.

63. The apparatus of claim 55, further comprising one or more stored sequences of instructions which, when executed by the processor, cause the processor to perform: generating an alert about the password if the password does not meet the quality criteria.

64. The apparatus of claim 55, further comprising one or more stored sequences of instructions which, when executed by the processor, cause the processor to perform: forcing a password change if the password does not meet the quality criteria.

65. The apparatus of claim 55, further comprising one or more stored sequences of instructions which, when executed by the processor, cause the processor to perform: blocking the user's access to the service if the password does not meet the quality criteria.

66. The apparatus of claim 55, further comprising one or more stored sequences of instructions which, when executed by the processor, cause the processor to perform: obtaining the password from the user via a graphical user interface.

67. The apparatus of claim 55, further comprising one or more stored sequences of instructions which, when executed by the processor, cause the processor to perform: obtaining the password from the user via an electronic interface.

68. The apparatus of claim 55, further comprising one or more stored sequences of instructions which, when executed by the processor, cause the processor to perform:: determining a quality score for the password, and wherein determining whether the password meets quality criteria comprises comparing the quality score to a predefined threshold value.

69. The apparatus of claim 55, further comprising one or more stored sequences of instructions which, when executed by the processor, cause the processor to perform:
   obtaining the password from a repository of passwords;
   making a first determination whether the password meets quality criteria;
   storing in a particular machine-readable medium an indication of the first determination for the password;
   wherein the step of determining whether the password meets quality criteria comprises accessing the particular machine-readable medium.

70. The apparatus of claim 55, further comprising one or more stored sequences of instructions which, when executed by the processor, cause the processor to perform: determining whether the password meets quality criteria for the service.

71. The apparatus of claim 55, further comprising one or more stored sequences of instructions which, when executed by the processor, cause the processor to perform: an access service obtaining the password from the user when the user attempts to access the service, and wherein the access service comprises machine executable instructions executing on the apparatus, and the service comprises machine executable instruction executing on the same apparatus.

72. The apparatus of claim 55, further comprising one or more stored sequences of instructions which, when executed by the processor, cause the processor to perform: an access service obtaining the password from the user when the user attempts to access the service, and wherein the access service comprises machine executable instructions executing on a first machine and the service comprises machine executable instructions executing on a second machine, wherein the first machine is distinct from the second machine.

* * * * *